United States Patent
Steentra et al.

(10) Patent No.: US 7,349,481 B2
(45) Date of Patent: Mar. 25, 2008

(54) COMMUNICATION USING AUDIBLE TONES

(75) Inventors: Jack Steentra, San Diego, CA (US); Ahmad Jalali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 434 days.

(21) Appl. No.: 10/356,425

(22) Filed: Jan. 30, 2003

(65) Prior Publication Data

US 2004/0001553 A1 Jan. 1, 2004

Related U.S. Application Data

(60) Provisional application No. 60/393,144, filed on Jul. 1, 2002.

(51) Int. Cl.
H04K 1/00 (2006.01)

(52) U.S. Cl. ........................ 375/260; 713/182
(58) Field of Classification Search ........... 375/260, 375/316, 295, 219, 220, 259, 317; 713/182, 713/184

See application file for complete search history.

(56) References Cited

U.S. PATENT DOCUMENTS

| | | | | |
|---|---|---|---|---|
| 6,130,859 A | * | 10/2000 | Sonnenschein et al. | 367/134 |
| 6,607,136 B1 | * | 8/2003 | Atsmon et al. | 235/492 |
| 6,768,778 B1 | * | 7/2004 | Chen et al. | 375/262 |
| 2001/0055352 A1 | * | 12/2001 | Bannasch et al. | 375/348 |
| 2002/0154772 A1 | * | 10/2002 | Morishita et al. | 380/201 |
| 2002/0191765 A1 | * | 12/2002 | Labaton | 379/201.01 |
| 2003/0026197 A1 | * | 2/2003 | Crawford | 370/203 |

* cited by examiner

Primary Examiner—Kevin Burd
(74) Attorney, Agent, or Firm—Amin, Turocy & Calvin, LLP

(57) ABSTRACT

An apparatus and method for communication using sound waves is disclosed. More particularly, orthogonal frequency division multiplexing scheme is used to transmit and receive digital data on sound waves. In one embodiment, the sound waves are used to exchange information. In another aspect, the sound waves are used to authenticate an individual or device.

26 Claims, 3 Drawing Sheets

COMMUNICATION USING AUDIBLE TONES

RELATED APPLICATIONS

This application claims priority from U.S. Provisional Patent Application entitled "Communication Using Audio Tones," Ser. No. 60/393,144, filed Jul. 1, 2002, which application is incorporated herein by reference in its entirety.

BACKGROUND OF THE INVENTION

I. Field of Invention

The invention generally relates to wireless communication and, more particularly to an orthogonal frequency division multiplexing scheme to modulate digital data into audible tones for wireless communication and authentication.

II. Description of the Related Art

Advances in communication technology have made it easier and faster to share and/or transfer information. High volumes of data can be communicated through data transmission systems such as a local or wide area network (for example, the Internet), a terrestrial communication system or a satellite communication system. These systems require complicated hardware and/or software and are designed for high data rates and/or long transmission ranges.

For transfers of data over short distances, such as between a personal computer and personal data assistants (PDAs), the systems above may be an inconvenient communication medium for users because of the complexity, delay and often the cost involved in accessing the systems. Accordingly, various communication systems have been developed using communication medium such as radio frequency (RF) or Infrared (IR) to transmit data. However, these systems also require specialized communication hardware, which can often be expensive and/or impractical to implement. Non-wireless connections can also be used to transfer data. However, to use non-wireless types of connections, users must physically have as well as carry wires or cables and make the physical connections for communication. This can be burdensome and inconvenient to users.

Moreover, with the increase in electronic commerce, the opportunities for fraudulent activity have also increased. Misappropriated identity in the hands of wrongdoers may cause damage to innocent individuals. In the worst case scenarios, a wrongdoer may actually purloin a party's identity in order to exploit the creditworthiness and financial accounts of an individual.

In order to prevent unauthorized persons from intercepting private information, various security and encryption schemes have been developed so that private information transmitted between parties is concealed. However, concealment of private information is only one aspect of the security needed to achieve a high level of consumer confidence in electronic commerce transactions. Another aspect is authentication.

Accordingly, electronic authentication of an individual may currently be performed by authentication through knowledge, such as a password, secure identification or a personal identification number (PIN); authentication through portable objects, such as a credit card, or a proximity card; and/or authentication through personal characteristics (biometrics), such as fingerprint, DNA, or a signature.

With current reliance on electronic security measures, it is not uncommon for an individual to carry multiple authentication objects or be forced to remember multiple passwords. Authentication through knowledge can thus be problematic for individuals who are forced to remember multiple passwords or PINs. Accordingly, such information may be written down on objects. However, writing down such information leaves an individual vulnerable to the theft of passwords, PIN codes, or even the object itself. Accordingly, there may still be a burden and/or expense to conceal the object from others.

Therefore, there is need for a less complex, yet user-friendly, inexpensive and/or efficient way to share and/or transfer information.

SUMMARY OF THE INVENTION

An orthogonal frequency division multiplexing (OFDM) scheme is proposed for digital data transmission and reception over acoustic channels.

In one embodiment, an apparatus comprises a sound generator, a storage medium coupled to the sound generator and an OFDM system coupled to the sound generator and the storage medium. The storage medium is configured to store digital data and the OFDM system is configured to modulate the digital data into multiple sound wave carriers for transmission using the sound generator. The apparatus may further comprise a processor coupled to the sound generator and the storage medium, wherein the digital data includes an instruction set executable by the processor for generating at least one cryptographic signature. The processor is thus configured to command the sound generator to generate audible tones associated with the at least one cryptographic signature. In another aspect, the apparatus may further comprise a user interface, wherein the digital data includes information input by a user through the user interface.

In another embodiment, an apparatus comprises a sound processor and an OFDM system coupled to the sound processor. The sound processor is configured to receive multiple sound wave carriers encoded with digital data. The OFDM is configured to recover the digital data from the multiple sound wave carriers. The apparatus may further comprise a processor coupled to the sound processor, wherein the processor is configured to verify the recovered digital data. In another aspect, the apparatus may further comprise a display configured to display the recovered digital data.

BRIEF DESCRIPTION OF THE DRAWINGS

The invention will be described in detail with reference to the following drawings in which like reference numerals refer to like elements, wherein.

DESCRIPTION OF THE INVENTION

Figure 1:
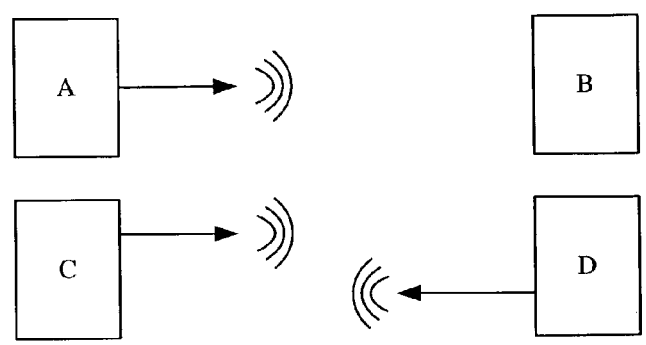
FIG. 1 shows examples of data transmission.

Generally, acoustic channels are provided to allow wireless transmission of digital data and authentication using orthogonal frequency division multiplexing (OFDM). As shown in FIG. 1, communication using sound waves may be in one direction or bi-directional between two devices. Device A may be an electronic apparatus implemented with at least a sound generator. Device B may be an electronic apparatus implemented with at least a sound processor. Device C may be an electronic apparatus implemented with at least a sound generator and a sound processor. Devices A, B and/or C may also comprise an input element. Examples of Devices A, B or C include, but are not limited to, computers such as laptops and desktops, personal data assistants (PDAs), mobile phones, telephones, answering machines, pagers, electronic appliances, electronic gaming consoles, electronic toys, televisions, remote controls, remotely operable devices or a combination thereof.

Generally, an OFDM system is used to encode and transmit digital data as audible tones through a sound generator and to receive audible tones embedded with digital data through a sound processor. In one aspect, the OFDM system is used to share and/or exchange information through multiple sound wave carriers. The OFDM system is also used to perform wireless authentication using audible tones. In this case, the digital data encoded, transmitted and received includes data for generating a cryptographic signature to authenticate an individual or device.

In the following description, the term "acoustic channel" refers to a path of communication by the use of sound between two or more points. The term "sound wave" refers to acoustic wave or pressure waves or vibrations traveling through gas, liquid or solid. Sound waves include ultrasonic, audio and infrasonic waves. The term "audio wave" refers to sound wave frequencies lying within the audible spectrum, which is approximately 20 Hz to 20 kHz. The term "ultrasonic wave" refers to sound wave frequencies lying above the audible spectrum and the term "infrasonic wave" refers to sound wave frequencies lying below the audible spectrum. The term "storage medium" represents one or more devices for storing data, including read only memory (ROM), random access memory (RAM), magnetic disk storage mediums, optical storage mediums, flash memory devices and/of other machine readable mediums. The term "machine readable medium" includes, but is not limited to portable or fixed storage devices, optical storage devices, and various other devices capable of storing instruction and/or data. The term audible "tone" refers to audio wave(s) of certain pitch and vibration that carry digital data. The term "multiple sound wave carriers" refers to the carrier signals in a multi-carrier system where multiple sound waves are used as the carrier signals.

Also, various aspects, features and embodiments of the data communication system may be described as a process that can be depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, function, procedure, software, subroutine, subprogram, or a combination thereof.

OFDM is a type of multicarrier communication technique and is well known in the art. In OFDM systems, the entire frequency bandwidth used for the transmission of signals is subdivided into a plurality of frequency subcarriers. Typically, adjacent frequency subcarriers are respectively orthogonal to each other. Orthogonality is a property of a set of functions such that the integral of the product of any two members of the set taken over the appropriate interval is zero. More specifically, orthogonal channels or frequencies are statistically independent and do not interfere with each other. As a result, orthogonality allows a receiver to demodulate a selected subcarrier without demodulating other subcarriers that are transmitted in parallel through multiplexed communication channel. Therefore, there is no cross talk among subcarriers and intersymbol interference (ISI) is significantly reduced.

Figure 2:
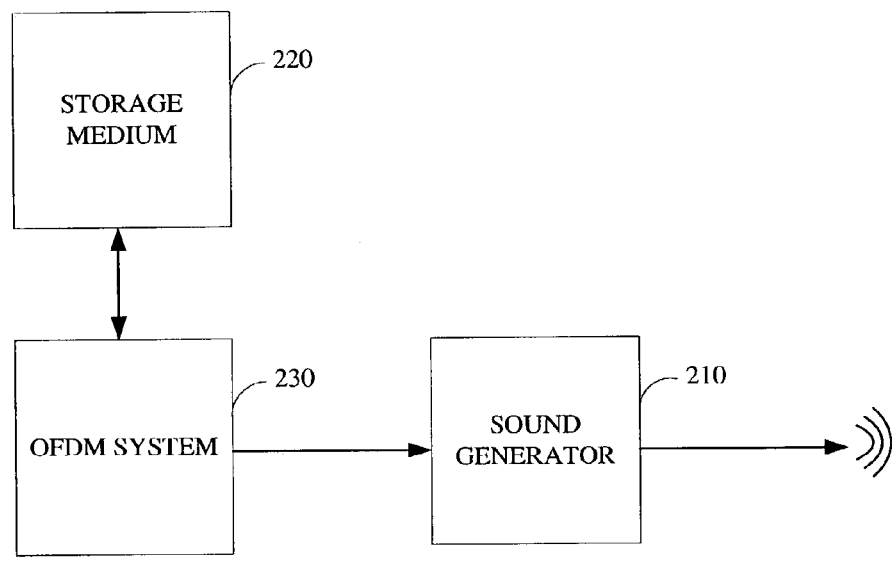
FIG. 2 shows a communication system for transmitting data using sound waves.

FIG. 2 shows a communication system 200 used to encode and transmit digital data on multiple sound wave carriers. System 200 comprises a sound generator 210; a storage medium 220 coupled to sound generator and configured to store digital data, and an OFDM system 230 coupled to sound generator 210 and storage medium 220. OFDM system 230 is configured to modulate the digital data stored in storage medium 220 into multiple sound wave carriers for transmission through sound generator 210.

Figure 3:
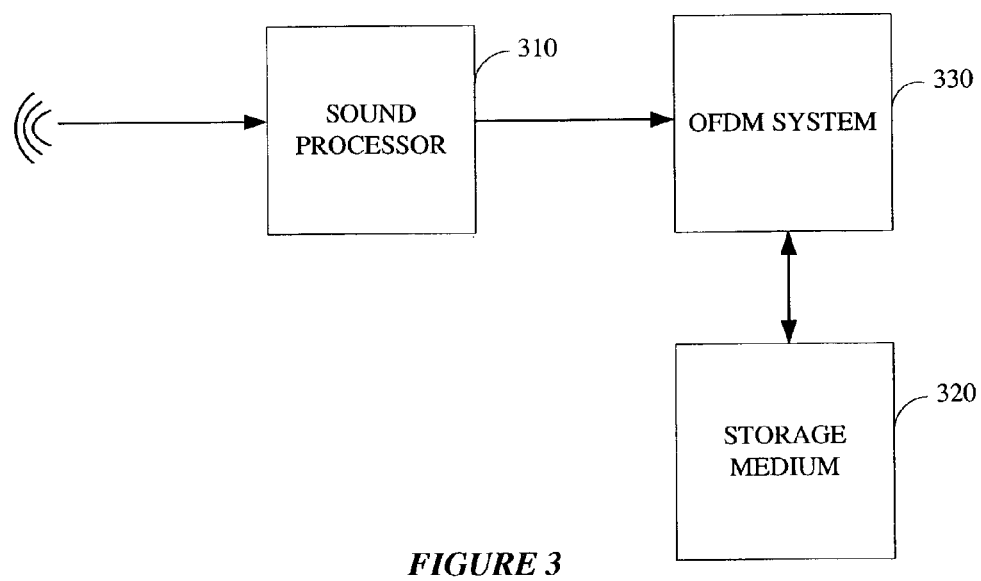
FIG. 3 shows a communication system for receiving data using sound waves.

FIG. 3 shows a communication system 300 used to receive digital data on multiple sound wave carriers. System 300 comprises a sound processor 310 and an OFDM system 330 coupled to sound processor 310. OFDM system 330 is configured to demodulate and recover digital data from multiple sound wave carriers received through sound processor 310. System 300 may further comprise a storage medium 320, wherein the digital data recovered by the OFDM system is stored.

Sound generator 210 may comprise an audio output element such as a speaker, a sound card or other apparatus capable of generating sound. Sound processor 310 may comprise an audio output such as a microphone, a sound card or other apparatus capable of processing sound. The speaker may be a built-in speaker or an external speaker that can be connected, coupled to or added to an existing system. Likewise, the microphone may be a built-in microphone or an external microphone that can be connected, coupled to or added to an existing system.

Sound generator 210, storage medium 220 and OFDM system 230 may be implemented on one or more circuit assemblies. Likewise, sound processor 310, storage medium 320 and OFDM system 330 may be implemented on one or more circuit assemblies. Such circuit assemblies may be installed in a self contained enclosure that mounts on or adjacent to existing hardware on Device A, B and/or C. Some embodiments may combine and implement communication systems 200 and 300 to allow both transmission and reception of data as sound. In such case, sound generator 210 and sound processor 310 may be combined into one apparatus such as a sound card. Also, storage medium 220 and 320 may be combined. In still other embodiments, all or a portion of communication systems 200 and 300 may be implemented by hardware, software, firmware or a combination thereof.

Figure 4:
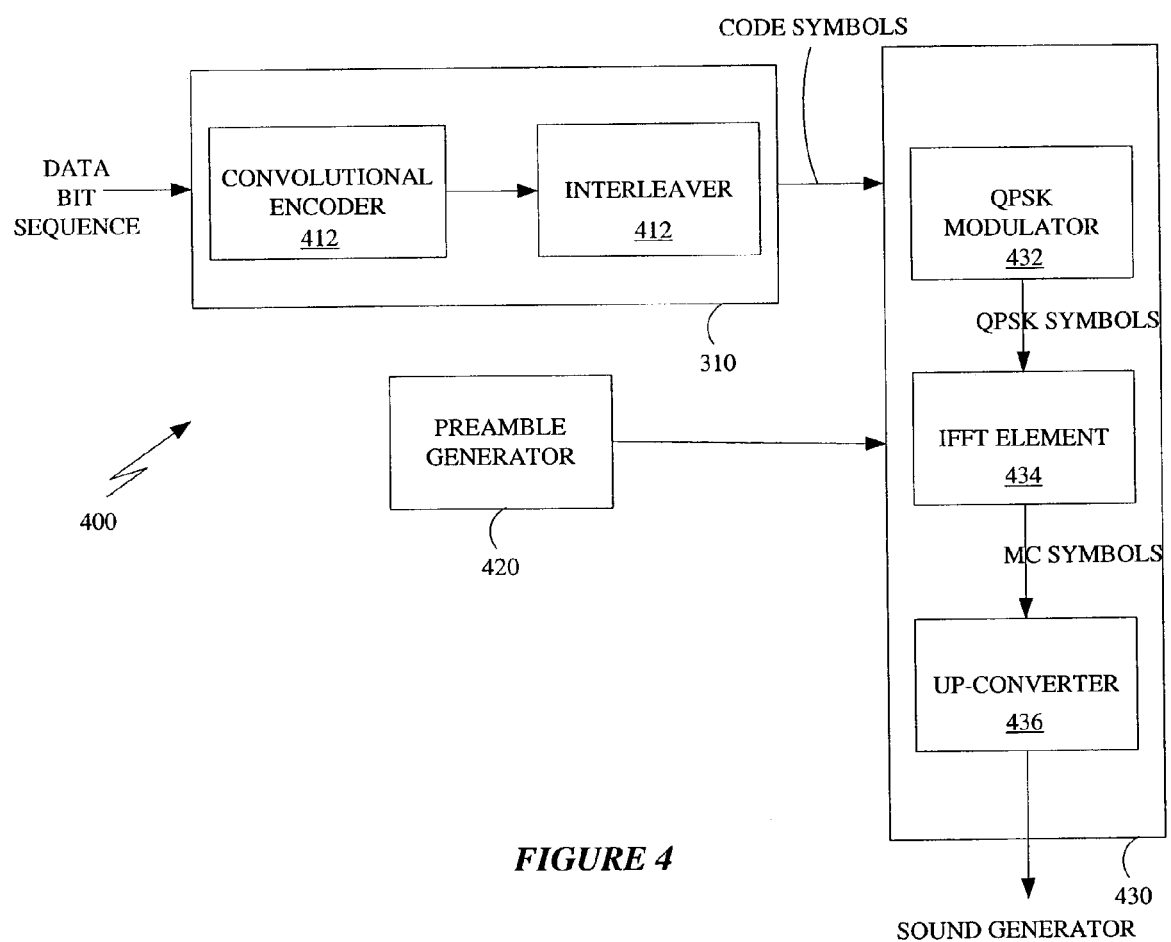
FIG. 4 shows an OFDM system for modulating and transmitting data on sound waves.
Figure 5:
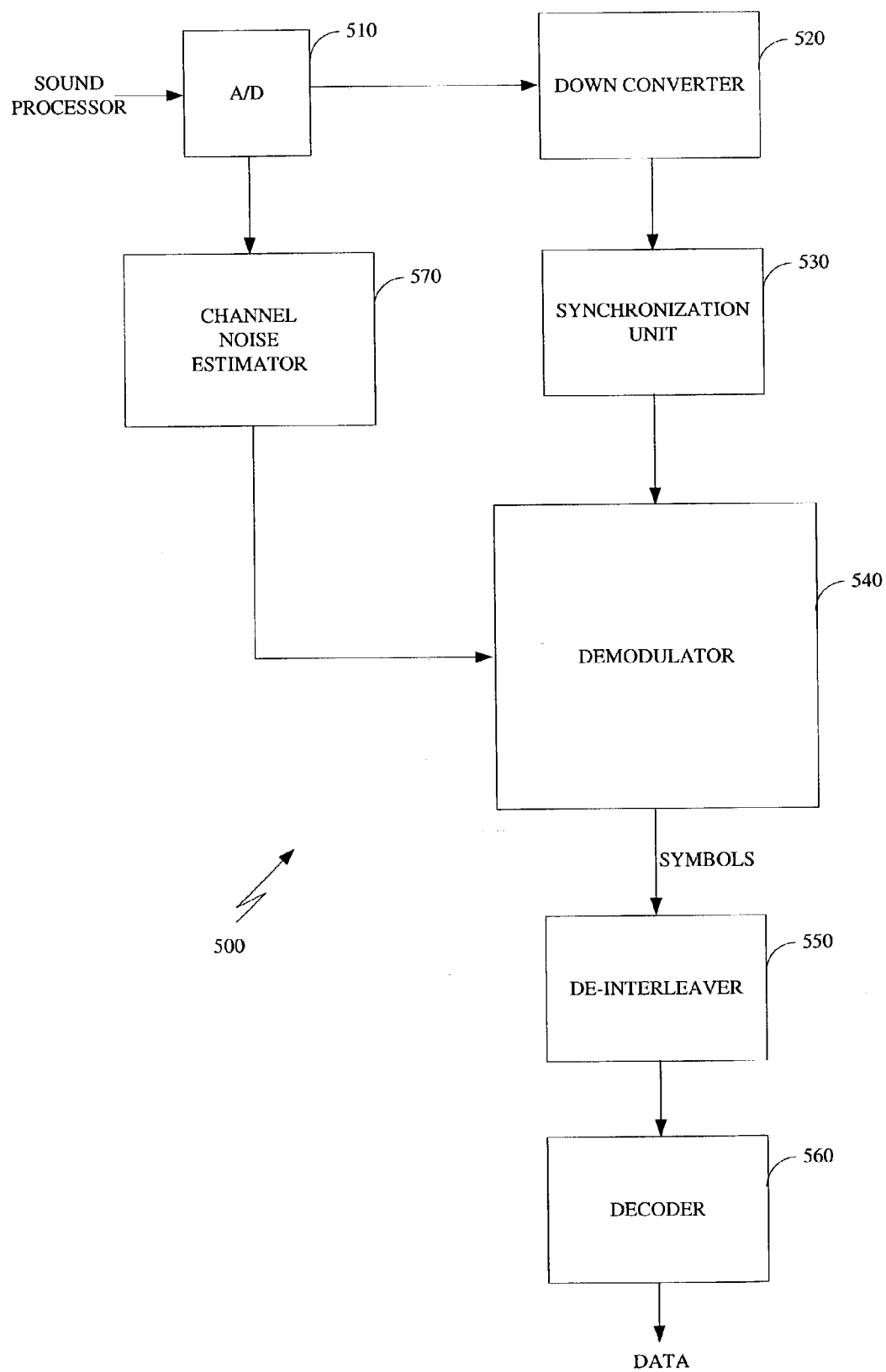
FIG. 5 shows an OFDM system for receiving and demodulating data using sound waves.

Furthermore, while OFDM systems 230 and 330 may respectively be various transmitter and receiver using OFDM scheme, FIG. 4 shows an OFDM transmitter 400 and FIG. 5 shows an OFDM receiver 500.

OFDM transmitter 400 comprises a front end processor 410, a preamble generator 420 and an OFDM modulator 430. Front end processor 410 receives and encodes digital data to output code symbols. The encoding may include error correction coding and/or error detection coding to increase the reliability of the acoustic channel. Such encoding may include, but is not limited to, interleaving, convolutional coding, and cyclic redundancy check (CRC) coding. For example, front end processor 410 may comprise a forward error correction (FEC) module 412 to encode digital data bit sequences to be transmitted and an interleaver 414 to interleave the FEC encoded bits, thereby generating code symbols.

Preamble generator 420 generates synchronization preambles. The synchronization preambles are transmitted to help the receiver in synchronizing to the frequency, time and phase of the received signal. Typically, timing reference preambles, frequency reference preambles and phase reference preambles are generated as the synchronization preambles and are sent to provide timing, frequency and phase references for the received symbols that carry digital data information. OFDM modulator 430 modulates the symbols into multiple sound wave carriers. Here, adjacent subcarriers are respectively orthogonal to each other. OFDM modulator 430 may comprise a digital modulator 432, an inverse fast fourier transform (IFFT) element 434 and an up converter 436 for modulation of the code symbols into multiple sound wave carriers. In one embodiment, digital modulator 432 may be a quadrature phase shift keying (QPSK) modulator. However, a digital modulation technique other than QPSK such as for example, amplitude shift keying (ASK), frequency shift keying (FSK), phase shift keying (PSK) or a combination thereof, can be implemented in modulator 430.

OFDM receiver 500 recovers digital data from the multiple sound wave carriers in a process that is inverse to the process for transmitting the digital data using sound waves. OFDM receiver 500 comprises an analog to digital (A/D) converter 510 to convert the incoming multiple sound wave carriers from an analog to digital signal; a down converter 520; a synchronization unit 530 to synchronize to the carrier in phase and arrival time of incoming data sequence; a demodulator 540 to demodulate and recover digital data from the multiple sound wave carriers by filtering out the carrier signals, a deinterleaver 550 to deinterleave the demodulated data, and a decoder 560 to decode the deinterleaved data for output to the user. OFDM receiver 500 may further comprise a channel noise estimator 570 to estimate the noise level in the acoustic channel for demodulation. Also, the decoder 560 may comprise a Viterbi decoder. Thus, the deinterleaved data can be decoded using well known implementations of the Viterbi algorithm.

Therefore, an OFDM scheme can be implemented in communication systems using sound waves for wireless transmission and/or reception of data. Depending upon the implementation, an OFDM scheme can be used to exchange information or to authenticate an individual or device through audible tones. Examples of communication systems using audible tones are discussed in the following co-pending U.S. patent application Ser. Nos., all of which are assigned to the assignee of the present invention and incorporated herein by reference: (1) 09/611,569, entitled "Method and Apparatus For Secure Identity Authentication with Audible Tones"; (2) 10/077,365, entitled "Method and Apparatus for Simplified Audio Authentication"; and (3) 10/356,144, entitled "Wireless Communication Using Sound."

As a communication device for sharing or exchanging information, communication system 200 encodes digital data including, but is not limited to, digital text, image and/or audio data into multiple sound wave carriers. The digital data may be, but is not limited to, personal information; contact information such as names, phone numbers, addresses; business information; calendar information; memos; software or a combination thereof. The information may be digital data input and/or stored by a user through a user interface (not shown). The information may also be digital data input or received from another device. Also, the digital data recovered at communication system 300 may be output to the user through a display (not shown) or other output devices.

As an authentication device, communication system 200 encodes and emits audible tones representing a cryptographic signature on multiple sound wave carriers. Communication system 300 receives and demodulates the multiple sound wave carriers to authenticate the cryptographic signature. Cryptography is well known in the art and is generally a process of encrypting private information such that a "key" is required to decrypt the encrypted information. Authentication devices may thus be used to verify the identity of an individual or device to allow transactions between the individual or device and various external devices.

More specifically, communication system 200 may further comprise a processor (not shown) to generate the cryptographic signature. The processor may be coupled to at least sound generator 210 and storage medium 220. However, it would be apparent to those skilled in the art that the placement of the processor is not important. The digital data that is stored in storage medium 220 may include an instruction set executable by the processor for generating at least one cryptographic signature. The processor then commands sound generator 210 to generate audible tones associated with the generated cryptographic signature.

Communication system 300 receives the audible tones and recovers the cryptographic signature to authenticate the signature in a cryptographically secure manner. More specifically, communication system 300 may further comprise a processor (not shown) to verify and authenticate the signature. The processor may be coupled to at least sound processor 310 and storage medium 320. Again, it would be apparent to those skilled in the art that the placement of the processor is not important. Storage medium 320 may store authentication information that is used by the processor to authenticate the signature.

In addition, multiple "keys" may be used. For example, a plurality of different sets of audible tones, each representing one of a plurality of cryptographic signatures can be used to verify an individual for different transactions. Accordingly, the processor can generate a cryptographic signature from one of a plurality of cryptographic keys and the audible tones generated by sound generator 210 is one of a plurality audible tone set, wherein each of the plurality of audible tone set is associated with one of the plurality of cryptographic keys.

Moreover, physical possession and operation of the authentication device provides another aspect of the required verification, in much the same manner that the physical possession of a key allows an individual to gain access through a locked door. Therefore, the authentication device may be small enough to attach to a key ring, belt hook or similar devices; or to fit in a purse, a pocket, or notebook. Alternatively, the authentication may be embedded into another device, such as a PDA or a mobile phone.

Accordingly, users can easily and conveniently perform a one way or bi-directional communication as described above. By using an OFDM system, data can be transmitted in a robust manner using audible waves. It is to be noted that while the embodiments have been described using audible tones, tones in a sound wave frequency other than the audio wave frequency may also be used. Furthermore, a standard speaker and/or microphone can be used to implement the invention. Therefore, the invention can easily be implemented in existing devices since most computers have built in speakers, microphones and/or sound processors, or add in sound cards, external speakers and/or external microphones.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 220 and/or storage 320 respectively, or in a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing embodiments are merely examples and are not to be construed as limiting the invention. The present teachings can be readily applied to other types of apparatuses. The description of the invention is intended to be illustrative, and not to limit the scope of the claims. Many alternatives, modifications, and variations will be apparent to those skilled in the art.

What is claimed is:

1. An apparatus for communicating digital data, comprising:
   a sound generator, the sound generator configured to generate audible tones;
   a storage medium coupled to the sound generator, the storage medium configured to store digital data; and
   an orthogonal frequency division multiplexing (OFDM) system coupled to the sound generator and the storage medium, the OFDM system configured to modulate the data into multiple audio wave carriers for transmission through the sound generator, the multiple audio wave carriers transmitted as audible tones.

2. The apparatus of claim 1, further comprising a processor coupled to the sound generator and the storage medium, wherein:
   the digital data includes an instruction set executable by the processor for generating at least one cryptographic signature associated with a user; and
   the processor is configured to command the sound generator to generate audible tones associated with the at least one cryptographic signature to authenticate the user.

3. The apparatus of claim 2, wherein the sound generator, storage medium, OFDM system, and processor are housed in a mobile handheld device configured to authenticate a user by the audible tones generated.

4. The apparatus of claim 2, wherein the at least one cryptographic signature is generated from one of a plurality of cryptographic keys and the audible tones is one of a plurality of audible tones, wherein each of the plurality of audible tones is associated with one of the plurality of cryptographic keys.

5. The apparatus of claim 1, further comprising a user interface, wherein: the digital data includes information input by a user through the user interface.

6. The apparatus of claim 5, wherein the information input by the user serves to authenticate the user to a recipient of at least one of a plurality of audible tones modulated into the multiple audio wave carriers.

7. The apparatus of claim 1, wherein the sound generator comprises at least a speaker for transmission of the multiple audio wave carriers.

8. A method of communicating digital data comprising:
   generating audible tones;
   storing digital data; and
   modulating the digital data into multiple audio wave carriers using orthogonal frequency division multiplexing, the multiple audio wave carriers transmitted as audible tones.

9. The method of claim 8, wherein the digital data comprises an instruction set for generating at least one cryptographic signature associated with a user; and
   generating audible tones associated with the at least one cryptographic signature to authenticate the user.

10. The method of claim 8, further comprising:
    receiving the digital data from a user through a user interface.

11. An apparatus for communicating digital data comprising:
    sound generating means for generating audible tones;
    means for storing digital data to be transmitted; and
    means for modulating the digital data into multiple audio wave carriers using orthogonal frequency division multiplexing for transmission through the sound generating means.

12. The apparatus of claim 11, further comprising processing means wherein:
    the digital data includes an instruction set executable by the processing means for generating at least one cryptographic signature associated with a user; and
    the processing means command the sound generator to generate audible tones associated with the at least one cryptographic signature to authenticate the user.

13. The apparatus of claim 12, wherein the at least one cryptographic signature is generated from one of a plurality of cryptographic keys and the audible tones is one of a plurality of audible tones, wherein each of the plurality of audible tones is associated with one of the plurality of cryptographic keys.

14. The apparatus of claim 11, further comprising input means, wherein:
    the digital data includes information input by a user through the input means.

15. The apparatus of claim 11, wherein the sound generating means comprises a speaker for transmission of the multiple audio wave carriers.

16. An apparatus for communicating digital data comprising:
    a sound processor configured to receive multiple audio wave carriers encoded with digital data using orthogonal frequency division multiplexing (OFDM), the multiple audio wave carriers received as audible tones; and
    an OFDM system coupled to the sound processor and configured to recover the digital data from the multiple audio wave carriers.

17. The apparatus of claim 16, further comprising a processor coupled to the sound processor, wherein the processor is configured to verify the recovered digital data to authenticate a sender.

18. The apparatus of claim 16, further comprising a display configured to display the recovered digital data to authenticate a sender.

19. The apparatus of claim 16, wherein the sound processor comprises a microphone.

20. A method of communicating digital data comprising:
    receiving multiple audio wave carriers encoded with digital data using orthogonal frequency division multiplexing, the multiple audio wave carriers received as audible tones; and
    recovering the data from the multiple audio wave carriers.

21. The method of claim 20, further comprising verifying the recovered data to authenticate a sender.

22. The method of claim 20, further comprising displaying the recovered data to authenticate a sender.

23. An apparatus comprising:
sound processing means for receiving multiple audio wave carriers encoded with digital data using orthogonal frequency division multiplexing, the multiple audio wave carriers received as audible tones; and
means for recovering the digital data from the multiple audio wave carriers.

24. The apparatus of claim 23, further comprising processing means for verifying the recovered digital data to authenticate a sender.

25. The apparatus of claim 23, further comprising display means for displaying the recovered digital data to authenticate a sender.

26. The apparatus of claim 23, wherein the sound processing means comprises a microphone.

* * * * *